(12) United States Patent
Miers, Jr. et al.

(10) Patent No.: US 6,960,302 B2
(45) Date of Patent: Nov. 1, 2005

(54) FLUID TREATMENT SYSTEM

(76) Inventors: Jay Alfred Miers, Jr., 178 Flint Rd., Langhorne, PA (US) 19047; James Thomas McNulty, 432 S. 5th St., Perkasie, PA (US) 18944

( * ) Notice: Subject to any disclaimer, the term of this patent is extended or adjusted under 35 U.S.C. 154(b) by 0 days.

(21) Appl. No.: 10/817,639

(22) Filed: Apr. 2, 2004

(65) Prior Publication Data

US 2004/0188337 A1 Sep. 30, 2004

Related U.S. Application Data

(62) Division of application No. 10/315,773, filed on Dec. 10, 2002, now abandoned.

(51) Int. Cl.[7] .............................. C02F 1/42; C02F 9/00
(52) U.S. Cl. ...................................... 210/664; 210/685
(58) Field of Search ................................. 210/664, 685, 210/188, 241, 259, 266, 284, 289, 291, 669

(56) References Cited

U.S. PATENT DOCUMENTS

| 2,841,550 A | 7/1958 | Beohner ..................... 210/664 |
| 3,922,255 A | 11/1975 | Koestler et al. ............. 526/65 |
| 3,985,648 A | 10/1976 | Casolo ........................ 210/669 |
| 4,427,549 A | 1/1984 | Brown et al. ................ 210/662 |
| 4,659,460 A | 4/1987 | Muller et al. ................ 210/241 |
| 4,673,507 A | 6/1987 | Brown ........................ 210/681 |
| 4,999,102 A | 3/1991 | Cox et al. .................... 210/137 |
| 5,354,460 A | 10/1994 | Kearney et al. .......... 210/198.2 |
| 5,833,846 A | 11/1998 | Tanabe et al. ............... 210/266 |
| 6,080,313 A | 6/2000 | Kelada ........................ 210/259 |

FOREIGN PATENT DOCUMENTS

| EP | 0497632 A1 | 1/1992 |
| WO | WO 01/54790 | 8/2001 |

OTHER PUBLICATIONS

Fred Wiesler, Membrane Contractors: An Introduction to the Technology, Ultrapure Water, pp. 27–31 (May/Jun. 1996).
Shirasawa Hiroshi; "Pure Water Making Apparatus"; Pub. No. JP 09253642; Pub. Date: Sep. 9, 1997 (Abstract Only).
Kurobe Hiroshi; "Ion Exchange Devise"; Pub. No. JP 09187765; Pub. Date: Juy 22, 1997 (Abstract Only).

Primary Examiner—Ivars C. Cintins
(74) Attorney, Agent, or Firm—Kenneth Crimaldi

(57) ABSTRACT

A fluid treatment system comprising at least two cylindrical vessels, wherein each vessel contains at least one treatment medium selected from ion exchange resins, polymeric adsorbents, inorganic adsorbents and activated carbon; each vessel has at each end a flat head and a fractal liquid transfer manifold; and the system comprises at least one membrane degasifier unit.

6 Claims, 3 Drawing Sheets

FLUID TREATMENT SYSTEM

This application is a division of prior application Ser. No. 10/315,773, filed Dec. 10, 2002, entitled "Fluid Treatment System," now abandoned benefit of which is claimed under 35 U.S.C. §120.

This invention relates to a high-efficiency fluid treatment system useful for ion exchange and adsorption processes.

A previous approach to a high-efficiency fluid treatment system is disclosed in U.S. Pat. No. 4,673,507. In this reference, the particle size of the ion exchange resin and the degree of overpacking of the resin beads are selected to provide substantially even distribution of fluid flow. The beads have a size of approximately 120 microns, and are maintained under compression at all times in resin beds which are shallower than those normally used for ion exchange.

The problem addressed by this invention is the need for a high-efficiency fluid treatment system using a treatment medium having a larger particle size to allow higher flow rates at normal bed depths.

STATEMENT OF INVENTION

The present invention provides a fluid treatment system comprising at least two cylindrical vessels, wherein each vessel contains at least one treatment medium selected from ion exchange resins, polymeric adsorbents, inorganic adsorbents and activated carbon; each vessel has at each end a flat head and a fractal liquid transfer manifold; and the system comprises at least one membrane degasifier unit.

DETAILED DESCRIPTION

Figure 1:
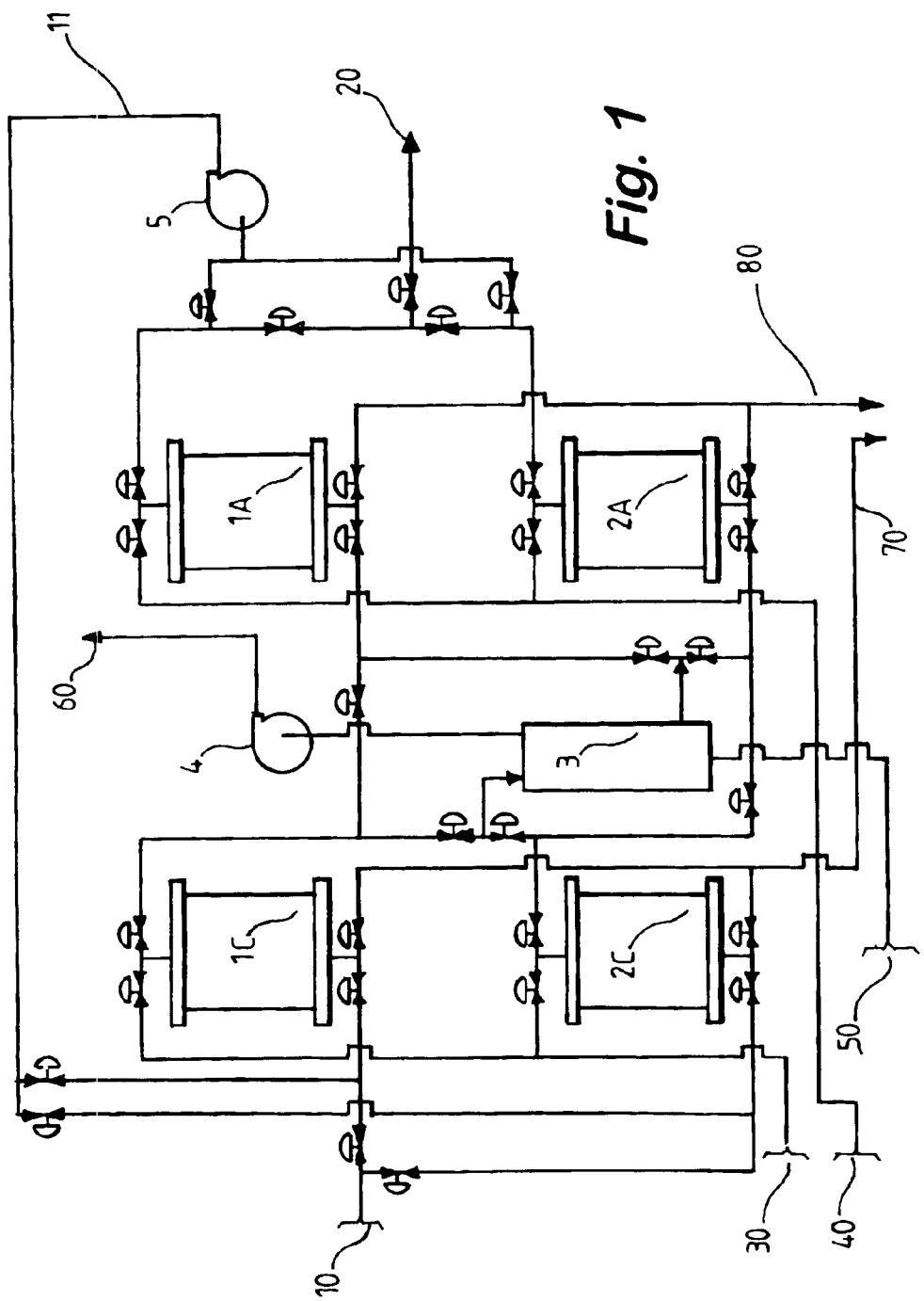
FIG. 1 is a schematic flow diagram illustrating a preferred embodiment of the invention in which the vessels contain ion exchange resins.

A "fractal liquid transfer manifold" is a manifold system for substantially evenly distributing a liquid by means of flow paths which are approximately hydraulically identical. Systems of this type are disclosed, for example, in U.S. Pat. Nos. 4,999,102 and 5,354,460; and in M. Kearney; "Control of Fluid Dynamics with Engineered Fractals"; *Chem. Eng. Commun.*; vol. 173, 43–52 (1999). The manifold may be constructed of any material compatible with the liquid being treated and the regenerant solution(s). Preferred materials include, for example, PVC, cPVC and polypropylene. Preferably, the fractal liquid transfer manifold is cylindrical and can be mounted on each end of a cylindrical vessel to allow liquid to enter the vessel with a substantially uniform distribution across the cross-section of the vessel. Preferably, the fractal liquid transfer manifold has a single flow inlet and multiple flow outlets. Preferably, the liquid transfer manifold has a diameter substantially equal to the outside diameter of the vessel, and is attached by clamps to the vessel. In another embodiment of the invention, the manifold has a diameter substantially equal to the inside diameter of the vessel and sits within the vessel. The substantially even flow distribution provided by the manifold allows the treatment media in the vessels to attain maximum efficiency by maintaining a sharp separation between liquid phases of different compositions, in turn allowing use of higher flow rates or smaller vessels. Regeneration efficiency also is maximized by this arrangement, which ensures that regenerant solution will be distributed efficiently by the manifold through which it enters the vessel. Moreover, when regenerant is directed through a vessel in a direction opposite to the service flow, and the vessel has a fractal liquid transfer manifold at each end, both the service and regenerant flows are distributed efficiently.

A membrane degasifier unit is a system capable of removing dissolved gases from a liquid. Preferably, the degasifier removes carbon dioxide and oxygen from water. Membrane degasifiers typically operate with a fluid on one side of the membrane and a gas flow on the other side. A microporous membrane in the degasifier allows gas molecules to pass through its pores, while retaining the liquid molecules. Pressures on both sides of the membrane are adjusted to facilitate the desired mass transfer. Preferably, the microporous membrane is a hydrophobic hollow fiber membrane made from a synthetic polymer, for example, polypropylene. For a description of the technology in this area, see F. Wiesler, "Membrane Contactors: An Introduction to the Technology"; *Ultrapure Water*; May/June 1996, 27–31.

Preferably, the cylindrical vessels used in the system of this invention are pressure vessels, and are set up in a vertical configuration. The vessels and associated piping and valves are constructed of any material compatible with the liquid being treated and the regenerant solution(s). Preferred materials include, for example, butyl-rubber lined steel and stainless steel. Preferably, the treatment medium substantially fills the interior of the vessel when the medium is swelled by the fluid. Preferably, the vessels have flat heads and flat bottoms, reducing the height of the vessels relative to vessels having curved heads and bottoms. Preferably, the inside diameter of the vessels is from 0.6 m to 1.5 m. Preferably, the inside diameter of the vessels is at least 0.75 m, more preferably at least 0.9 m. Preferably, the inside diameter is no more than 1.25 m. In one preferred embodiment of the invention, the inside diameter of the vessels is from 1.1 m to 1.25 m. The height of the vessels preferably is at least 0.6 m, more preferably at least 0.9 m, and most preferably at least 1.1 m. Preferably, the height of the vessels is no more than 1.3 m. In a preferred embodiment of the invention, the height of the vessels is from 1.2 m to 1.3 m.

When the treatment system is an ion exchange system, it comprises at least one vessel containing an anion exchange resin and at least one vessel containing a cation exchange resin. Typically, a pair of vessels, each containing one of these resins, is used in series to demineralize water. Preferably, more than one pair of vessels is present in the ion exchange system to allow regeneration of one or more pairs of vessels while one or more pairs of vessels are in service. The most preferred ion exchange system contains two pairs of vessels. In a preferred embodiment of the invention, the ion exchange system, including two pairs of vessels, the membrane degasifying system, and associated piping, is constructed in two parts, each on a support frame ("skid"), and each part measuring no more than 2.30 m wide by 2.37 m high by 6.08 m long. These dimensions allow each part to fit within a standard sea transport container.

Preferably, the ion exchange system contains relatively large beads to allow high flow rates. Preferably, the beads are commercially available uniform particle size resins having a harmonic mean size from 400 microns to 700 microns, more preferably from 500 microns to 650 microns, and most preferably from 600 microns to 650 microns. Preferably, at least 95% of the beads are within 50 microns of the mean. Most preferably, at least 95% of the beads are in a size range from 580 microns to 680 microns. Uniform particle size resins are known and are manufactured by various methods, including screening, expanding and jetting. For example, U.S. Pat. No. 3,922,255 discloses a method for producing beads of a controllable uniform size.

Typically, ion exchange systems require a larger amount of anion exchange resin relative to the amount of cation exchange resin. Use of a membrane degasifier unit in the system of the present invention prior to the anion exchange vessel removes carbon dioxide from the inlet water and thus reduces the load on the anion exchange resin. This increases the efficiency of the anion exchange resin and, in a preferred embodiment of the invention, allows the anion exchange vessel to be reduced in size to be substantially the same size as the cation exchange vessel. Preferably the cation and anion exchange vessels are the same size for maximum efficiency and flexibility in construction of the system.

In the preferred ion exchange system, even distribution of flow and use of resin beads in the preferred particle size range allow use of higher flow rates. Preferably, water is treated in the preferred ion exchange system at a flow rate from 10 $m^3$/hour to 60 $m^3$/hour, more preferably at a flow rate of at least 20 $m^3$/hour, more preferably at least 30 $m^3$/hour and most preferably at least 40 $m^3$/hour. In one preferred embodiment of the invention, water is treated at a flow rate from 40 $m^3$/hour to 60 $m^3$/hour. In another preferred embodiment of the invention, water is treated at a flow rate from 30 $m^3$/hour to 40 $m^3$/hour. In another preferred embodiment of the invention, water is treated at a flow rate from 20 $m^3$/hour to 30 $m^3$/hour. Preferably, the smaller flow ranges correspond to the smaller vessel sizes mentioned herein. Regeneration of the ion exchange resins may be performed at a variety of flow rates, depending on regenerant concentration, volume and contact time with the resin, as is understood by those skilled in the art. Preferably, regeneration is performed at a flow rate from 2 $m^3$/hour to 10 $m^3$/hour. Preferably, regeneration of the ion exchange resins is performed at a flow rate of 2 to 8 bed volumes per hour (BV/h). Anion exchange resins typically regenerate more slowly than cation exchange resins; for example, regeneration of anion exchange resin with sodium hydroxide preferably is performed at 3 to 6 BV/h, most preferably at about 4 BV/h. Preferably, cation exchange resins are regenerated with sulfuric acid at 4 to 8 BV/h, most preferably at 6 to 8 BV/h. Preferably, the service flow enters the vessel at the bottom, while the regenerant flow enters from the top, and the vessels have a fractal liquid transfer manifold at the bottom and another at the top to evenly distribute both the service and regenerant flows.

Typically, ion exchange systems have a vessel service time that is long relative to the vessel regeneration time. For example, service times of 18 hours, with regeneration times of 4 hours, are not uncommon. The system of this invention allows use of high flow rates relative to vessel size. A consequence of these higher flow rates is that the service time is decreased and is more nearly equal to the regeneration time. For example, the preferred ion exchange system of this invention has a service time of approximately 3 hours and a regeneration time of approximately 2 hours. In some applications, the ability to keep both vessels in use the majority of the time may be desirable.

Referring to FIG. 1, which illustrates a preferred embodiment in which the treatment system is an ion exchange system with two pairs of vessels, the feed water enters through line 10 and is directed by the appropriate valve positions to the bottom inlet of the cation exchange vessel in service, either 1C or 2C, where it flows through a fractal liquid transfer manifold and then the resin bed, exiting the top of the vessel through another fractal liquid transfer manifold. The flow then is routed to the membrane degasifier bank, 3, where it passes through membrane degasifier units in parallel. Air enters the degasifier bank through line 50 and exits through vacuum pump 4 and line 60. Water flow from the degasifier is routed to the bottom inlet of the anion exchange vessel in service, either 1A or 2A, where it flows through a fractal liquid transfer manifold and then the resin bed, exiting the top of the vessel through another fractal liquid transfer manifold, and then is routed to a deionized water storage tank through line 20. If desired, water exiting either anion exchange vessel may be recycled through both the cation and anion exchange vessels in service by means of recycle pump 5 and line 11.

Simultaneous regeneration of the cation exchange vessel not in service is accomplished with acid which enters through line 30 and is routed to the top of the cation exchange vessel being regenerated, either 1C or 2C, where it flows through a fractal liquid transfer manifold and then the resin bed, exiting the bottom of the vessel through another fractal liquid transfer manifold, then passing through line 70 to a neutralization vessel. Regeneration of the anion exchange vessel not in service, 1A or 2A, is accomplished by an analogous process with sodium hydroxide solution entering through line 40 and exiting to the neutralization vessel through line 80.

Figure 2:
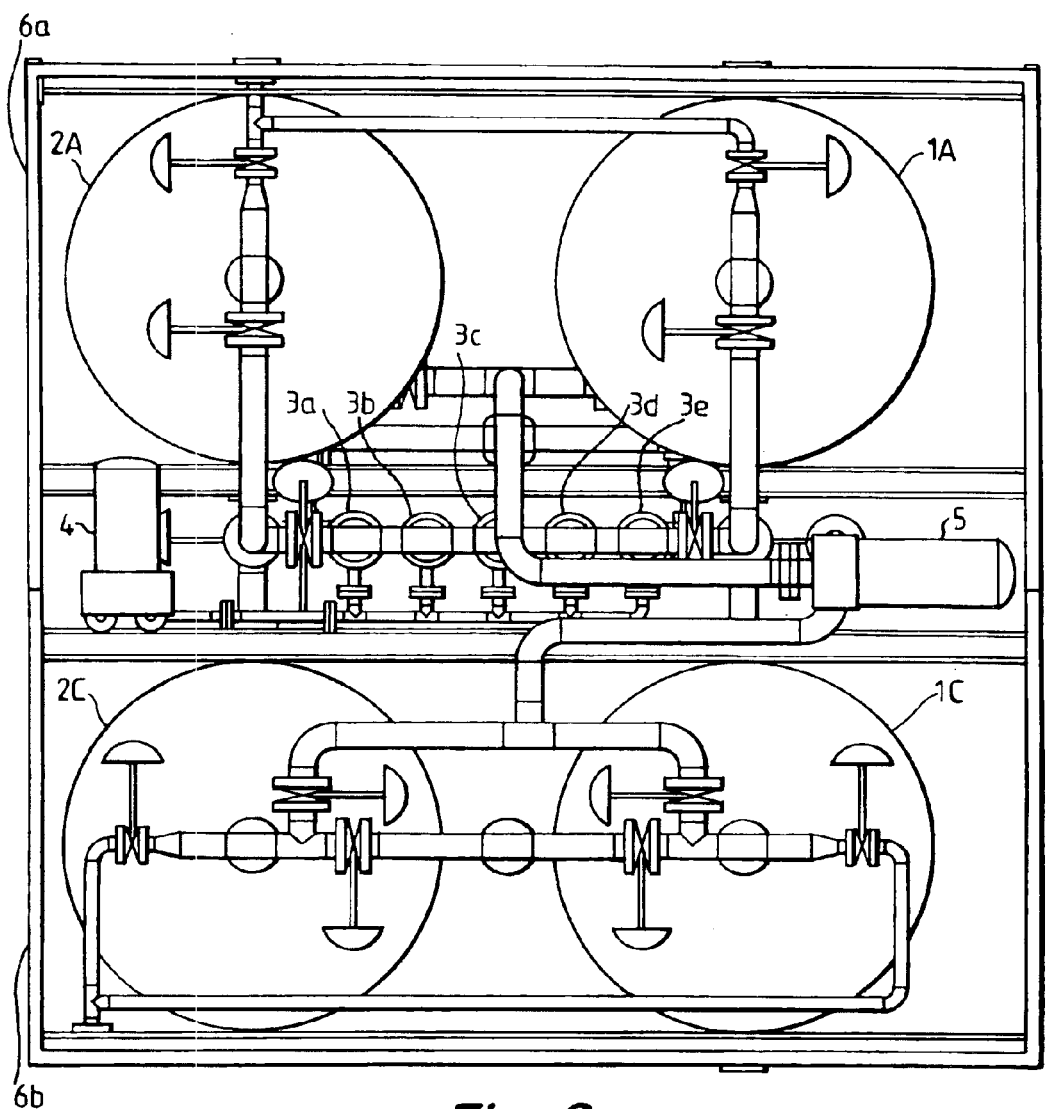
FIG. 2 is a drawing showing the bottom view of a skid-mounted ion exchange system according to a preferred embodiment of this invention.
Figure 3:
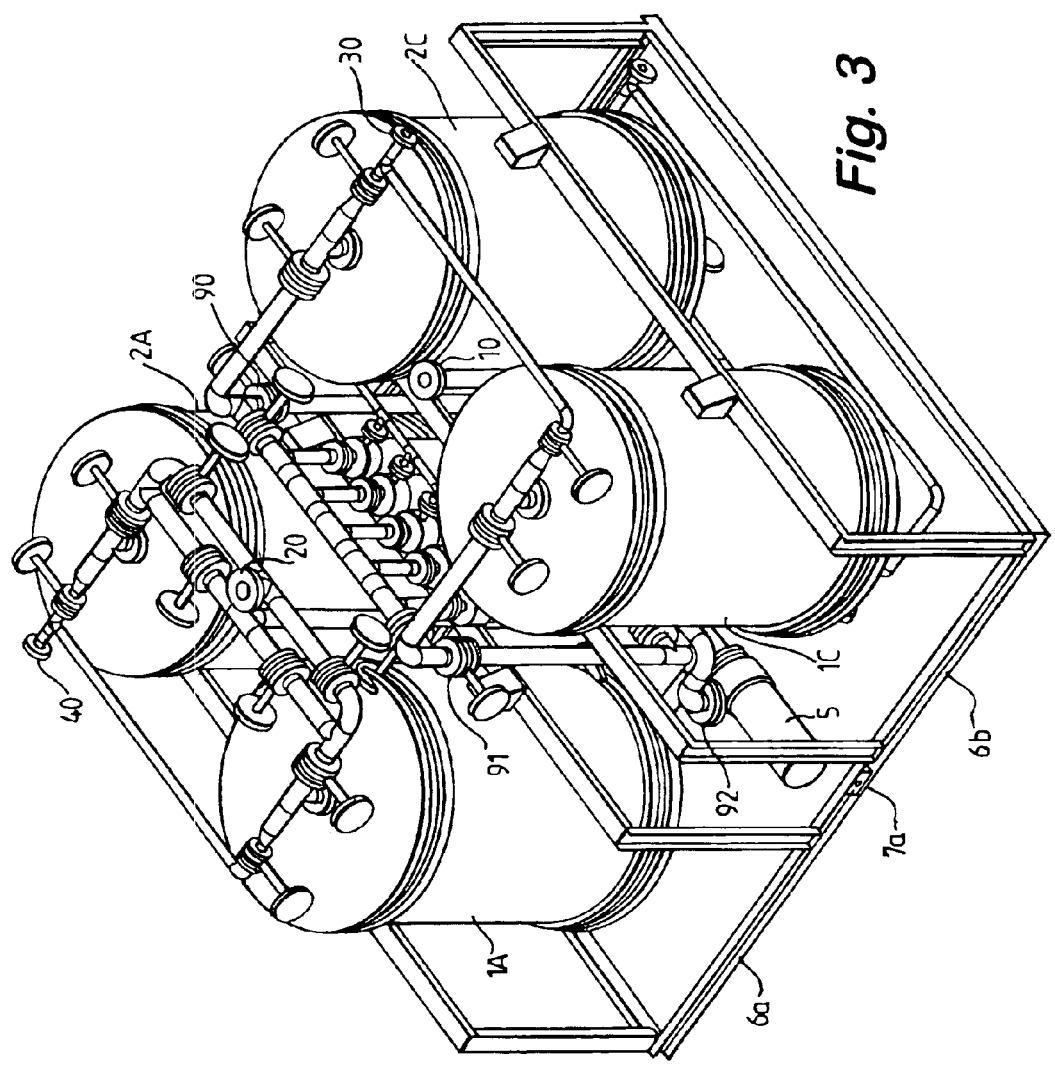
FIG. 3 is a drawing showing an isometric top view of a skid-mounted ion exchange system according to a preferred embodiment of this invention.

FIGS. 2 and 3, respectively, depict bottom and top isometric views of the preferred skid-mounted ion exchange system depicted schematically in FIG. 1. The membrane degasifier bank, 3, consists of five membrane degasifier units, 3a–3e, configured for parallel flow, with each unit containing hollow fiber polypropylene membrane having a surface area of approximately 42 $m^2$. The two parts of the frame, 6a and 6b, are fastened together by brackets, 7a and 7b (not visible). Frame 6a is approximately 1.82 m wide and 3.5 m long. Frame 6b is approximately 1.67 m wide and 3.5 m long. Flanges 90, 91 and 92 can be disconnected, and brackets, 7a and 7b, removed to separate the system into two parts, one attached to frame 6a and the other attached to frame 6b. Each part of the system, including the frame, vessels and all piping and valves, is approximately 2.33 m in height. Each frame with the attached vessels, pumps, lines and valves, will fit into a standard sea transport container.

What is claimed is:

1. A method for treating water comprising passing water at a flow rate of at least 30 $m^3$/hour through a fluid treatment system comprising at least two cylindrical vessels containing ion exchange resin, wherein at least one vessel contains an anion ion exchange resin and at least one vessel contains a cation ion exchange resin; the anion and cation ion exchange resins are beads having a harmonic mean size from 400 microns to 700 microns, and having at least 95% of beads no more than 50 microns from the harmonic mean size; each vessel has at each end a flat head and a fractal liquid transfer manifold; an inside diameter of each vessel is from 0.75 m to 1.25 m; and the system comprises at least one membrane degasifier unit.

2. The method of claim 1 in which said at least one vessel containing an anion ion exchange resin and said at least one vessel containing a cation ion exchange resin are substantially equal in size.

3. The method of claim 2 in which the fluid treatment system has two vessels containing an anion ion exchange resin and two vessels containing a cation ion exchange resin.

4. The method of claim 3 in which the fluid treatment system is constructed in two parts, each on a support frame, each part having a width no more than 2.30 m, a height no more than 2.37 m, and a length no more than 6.08 m.

5. The method of claim 4 in which a height of each vessel is from 1.2 m to 1.3 m and an inside diameter of each vessel is from 1.1 m to 1.25 m.

6. The method of claim 5 in which the flow rate is at least 50 m$^3$/hour.

* * * * *